No. 685,494. Patented Oct. 29, 1901.
N. W. STORER.
SYSTEM OF ELECTRICAL DISTRIBUTION.
(Application filed Sept. 6, 1900.)
(No Model.)
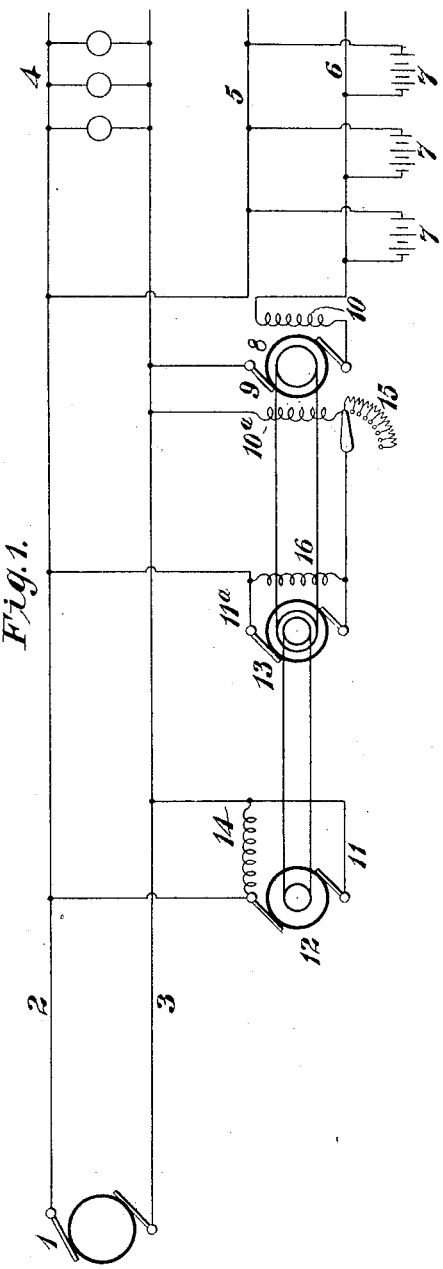
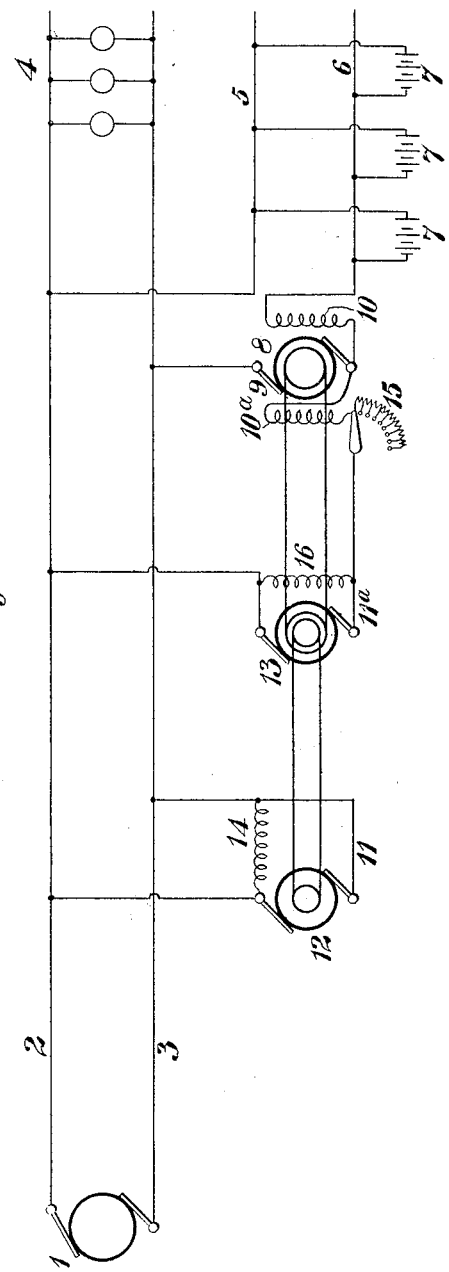
WITNESSES:
C. L. Belcher
Birney Hines
INVENTOR
Norman W. Storer
BY
Wesley G. Carr
ATTORNEY.

UNITED STATES PATENT OFFICE.

NORMAN W. STORER, OF EDGEWOOD PARK, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

SPECIFICATION forming part of Letters Patent No. 685,494, dated October 29, 1901.

Application filed September 6, 1900. Serial No. 29,211. (No model.)

*To all whom it may concern:*

Be it known that I, NORMAN W. STORER, a citizen of the United States, residing at Edgewood Park, in the county of Allegheny and State of Pennsylvania, have invented a new and useful Improvement in Systems of Electrical Distribution, of which the following is a specification.

My invention relates to systems of electrical distribution; and it has for its object to provide a means for maintaining a constant electromotive force in a branch circuit receiving its energy from a main circuit the electromotive force of which is variable.

It not infrequently occurs that the work-circuit from which a variable number of lights or motors, or both, receives energy has a working voltage that varies between more or less widely separated limits, according to the number and character of translating devices included in the circuit. Such variations in voltage may not be particularly objectionable in connection with the operation of the translating devices usually supplied by the system; but in case it is desired to utilize the energy from such a circuit for the charging of secondary batteries or for any other purpose where an approximately constant voltage is necessary the variation is obviously a serious objection, which must be overcome in some manner. It also frequently occurs that the working electromotive force of a circuit having an approximately constant voltage is either higher or lower than that desired for certain work to be performed.

The method and means constituting the subject-matter of my invention are intended to automatically provide a substantially constant voltage of the desired value when used in connection with a circuit having any of the characteristics above specified.

My invention is illustrated in the accompanying drawings, in which—

Figure 1 is a diagram of the machines and circuits employed, and Fig. 2 is a similar view of a modification.

A direct-current generator 1 supplies the distributing-mains 2 and 3 with current for translating devices 4 of any number and character suited to the size and character of the generator. By reason of the variation in the number and character of the translating devices supplied from time to time or by reason of inefficient regulation of the generator or of its driving-engine the voltage of the circuit 2 3 is liable to vary between more or less widely separated limits and, in fact, does often so vary in practice. The branch circuit 5 6 as here illustrated is utilized for charging secondary batteries 7. The number of such batteries may be varied from time to time within wide limits, the maximum number being large. If such is the case and all are to have substantially the same voltage in use, an automatic voltage adjustment is extremely desirable in order that the electromotive force may be constant during any given period of charging. The charging of secondary batteries is here illustrated and described as an example merely, it being obvious that other translating devices requiring constant electromotive force may be utilized in connection with the branch circuit 5 6 with equal facility. In order to make the voltage of the branch circuit 5 6 substantially constant, I include in it the armature 8 of a machine 9 and couple this armature to the armatures 12 and 13 of two machines 11 and 11ª in any suitable manner. This coupling may be by means of belts or the armature may be mounted upon a single shaft or upon separate shafts connected together by either rigid or flexible couplings, as is well known in the art. In order to compensate for variations in ohmic drop across the armature 8 of the machine 9, caused by variations in load on the circuit 5 6, I provide the machine 9 with a series winding 10. The armature 12 is connected across the circuit 2 3 and its field-magnet is provided with a shunt-winding 14 so proportioned with reference to its core that the iron of the field-magnet shall be saturated under all conditions of normal operation. The armature 13 is connected at one side to the distributing-conductor 2 and at the other side to one terminal of the field-magnet winding 10ª of the machine 9. I have shown an adjustable rheostat 15 in connection with the field-magnet winding 10ª in order that a current traversing such winding may be varied, if desired.

The field-magnet for the armature 13 is provided with a shunt-winding 16 so proportioned with reference to the core that the iron in the latter shall be always worked at a point well below saturation.

It may be found desirable to provide the machine 11ª with a field-magnet the iron of which is well annealed and laminated throughout in order to guard against an objectionable amount of residual magnetism.

It will be seen from the illustration and description that the armature 12 always controls the speed of the armatures 13 and 8, and since the field-magnet core of the machine 11 is always saturated the speed of its armature will respond quickly to all changes in voltage in the circuit 2 3, with which it is connected. Those changes in speed being imparted to the armature 13, which has an unsaturated field-magnet, the electromotive force supplied by this armature to its circuit, or the counter electromotive force, as the case may be, will vary rapidly with such changes in speed, and will thus vary the excitation of the field-magnet of the machine 9 and in turn vary the electromotive force impressed by the latter machine upon the circuit 5 6. By properly proportioning the windings the adjusting electromotive force supplied to the circuit 5 6 by the machine 9 may be made such as to be almost exactly equal to the difference between the electromotive force of the main circuit 2 3 and the constant electromotive force desired in the branch circuit 5 6. This will be either a boosting or a counter electromotive force, depending upon whether the main-circuit voltage is less or greater than the constant voltage desired.

In order that a full understanding of the operation of my invention may be had, it may be stated that when a shunt-wound machine and a separately-excited machine are mechanically coupled together and are also electrically connected in parallel they will both run as motors, provided the field-current of the separately-excited machine is adjusted to give the same voltage on its armature-terminals as that of the shunt-machine and the line to which both machines are connected. If the field of the separately-excited machine be strengthened, its armature will generate a higher voltage than that of the shunt-machine and the line, and it will therefore act as a generator and supply current to the line. The shunt-machine in this case must act as a motor and furnish power to drive the generator. If, on the other hand, the field of the separately-excited machine be weakened, it will generate a lower electromotive force and will speed up, so as to drive the shunt-machine as a generator to produce an electromotive force that is higher than that of the line. It follows, therefore, that a shunt-machine which is directly coupled to another machine having such construction and circuit connections as to either supply or absorb power will automatically act as a generator or as a motor, according to the operative condition of the other machine.

In the present case the current for the branch circuit 5 6 always flows through the armature of the machine 9, and when the field-magnet of said machine is excited in one direction the voltage generated will be added to the voltage of line 2 3, and consequently to that of the branch circuit 5 6, and the machine must therefore be acting as a generator. When the field-magnet of machine 9 is excited in the opposite direction, so as to generate an electromotive force which opposes that of line 2 3, it is taking energy from the circuit and must therefore run as a motor.

The small exciter 11ª is shunt-wound, so that when the line-voltage of circuit 2 3 is equal to that required by branch circuit 5 6 the speed of its armature (which is controlled by shunt-machine 11) is such as to generate an electromotive force that is equal to and opposes the voltage in circuit 5 6. The resultant electromotive force is therefore zero, and consequently no current will flow in the magnet-winding 10ª of the machine 9. If the voltage of branch circuit 5 6 increases, the speed of machine 11 will increase proportionally and the voltage of the exciter 11ª will increase much more rapidly, so as to give a resultant current and voltage in field-circuit of machine 9 in such a direction as to generate an electromotive force in the armature of said machine that opposes the line electromotive force in branch circuit 5 6, thus causing the machine to absorb power from the line and run as a motor.

It is obvious that if the voltage of circuit 2 3 decreases the voltage of the exciter 11ª will be much reduced and the resultant voltage for the field of machine 9 will be reversed in direction and the machine will operate as a generator to boost the voltage in branch circuit 5 6.

It follows from the foregoing explanation that when the machine 9 runs as a generator the machine 11 must supply the power and that when the machine 9 runs as a motor the machine 11 will act as a generator. In the same way the machine 11ª will act as a motor when the line-voltage is higher than the exciter electromotive force and as a generator when the line-voltage is lower than the exciter electromotive force. In this machine the armature-current is reversed, while the field-current is always in the same direction.

The foregoing description applies substantially to Fig. 2, the only difference between what is shown in this figure and what is shown in Fig. 1 being the connection of one terminal of the field-magnet winding 10ª of the machine 9. In Fig. 2 this terminal is connected to the conductor 6 of the circuit 5 6 instead of to the conductor 3 of the circuit 2 3, as in Fig. 1.

Where several different voltages are needed, as is the case, for example, at the various stages in the charging of secondary batteries, and only a single main circuit is available, the number of sets of machines 9, 11, and 11ª and corresponding pairs of bus-bars that are employed will correspond to the number of different voltages desired.

I desire it to be understood that my invention is not limited to details of construction and arrangement except in so far as such details are specified in the claims.

I claim as my invention—

1. In a system of electrical distribution, the combination with a main circuit having a variable electromotive force and a branch circuit requiring a substantially invariable electromotive force, of a dynamo-electric machine connected across the main circuit and having a shunt-wound, normally-saturated field-magnet, a self-excited dynamo-electric machine having an unsaturated field-magnet and having one of its terminals connected to one side of the main circuit and a third dynamo-electric machine having its armature in the branch circuit and having a field-magnet winding in the armature-circuit of the machine that has the unsaturated field-magnet, the armatures of all of said machines being mechanically connected.

2. In a system of electrical distribution, the combination with a main circuit having a variable electromotive force and a branch circuit requiring a substantially constant electromotive force, of an armature in said branch circuit, a field-magnet for said armature having a winding one terminal of which is connected to one conductor of the main circuit, two dynamo-electric machines having their armatures mechanically connected together and to the armature that is included in the branch circuit, one of said machines being connected across the main circuit and having a saturated field-magnet and the other machine being connected between one conductor of the main circuit and one terminal of the field-magnet winding of the branch-circuit machine and having an unsaturated field-magnet.

3. In a system of electrical distribution, the combination with a main circuit having a variable electromotive force and a branch circuit requiring a substantially constant electromotive force, of two mechanically-connected dynamo-electric machines, the speed of which varies as the main-circuit electromotive force varies, and a voltage-adjusting machine for the branch circuit the armature of which is mechanically connected to the armatures of the first-named machines and a field-magnet winding of which is in series with the armature of one of the first-named machines.

4. In a system of electrical distribution, the combination with a main circuit having a variable voltage and a branch circuit requiring an approximately constant voltage, of a voltage-adjusting machine having its armature in the branch circuit, a motor-generator having a shunt-wound, saturated field-magnet for one armature and shunt-wound, unsaturated field-magnet for the other armature, both of said armatures being electrically connected across the main circuit and mechanically connected to the armature of the voltage-adjusting machine, and a field-magnet winding for the voltage-adjusting machine connected in series with the motor-generator armature having the unsaturated field-magnet.

5. In a system of electrical distribution, the combination with a source of variable voltage, its distributing-mains and a branch circuit requiring a substantially constant voltage, of a motor-generator having a saturated field-magnet for one armature and an unsaturated field-magnet for the other armature, both of said armatures having circuit connections with the main source of current, and a voltage-adjusting dynamo-electric machine having its armature in the branch circuit and having a field-magnet winding connected in series with the motor-generator armature that has the unsaturated field-magnet.

6. In a system of electrical distribution, the combination with a source of variable voltage, its distributing-mains and a branch circuit requiring a substantially constant voltage, of a motor-generator having a saturated field-magnet for one armature and an unsaturated field-magnet for the other armature, both of said armatures having circuit connections with the main source of energy and a voltage-adjusting dynamo-electric machine having its armature in the branch circuit and having a series field-magnet winding and also a field-magnet winding in series with the motor-generator armature that has the unsaturated field-magnet.

7. The combination with a source of variable electromotive force and a main circuit supplied thereby, of a branch circuit supplied from said main circuit and means controlled by the electromotive-force variations in the main circuit for introducing an electromotive force, either opposed to or acting with the electromotive force supplied directly to the branch circuit and thereby maintaining a substantially constant electromotive force in the branch circuit.

In testimony whereof I have hereunto subscribed my name this 28th day of August, 1900.

NORMAN W. STORER.

Witnesses:
BIRNEY HINES,
JAMES B. YOUNG.